US005229014A

United States Patent [19]

Collins

[11] Patent Number: 5,229,014

[45] Date of Patent: Jul. 20, 1993

[54] HIGH EFFICIENCY CENTRIFUGAL SEPARATION APPARATUS AND METHOD USING IMPELLER

[75] Inventor: Arthur R. Collins, Oklahoma City, Okla.

[73] Assignee: Vortech International, Inc., Dallas, Tex.

[21] Appl. No.: 809,940

[22] Filed: Dec. 18, 1991

[51] Int. Cl.[5] .......... B01D 17/038

[52] U.S. Cl. .......... 210/787; 55/1; 55/52; 55/203; 210/512.1; 210/512.3

[58] Field of Search .......... 210/360.1, 360.2, 781, 210/512.3, 787, 512.1; 55/1, 199, 201, 467, 470, 52, 203; 209/1, 139.2, 144, 148, 211

[56] References Cited

U.S. PATENT DOCUMENTS

| | | | |
|---|---|---|---|
| 1,219,796 | 3/1917 | Atkins et al. | 210/360.2 |
| 3,271,929 | 9/1966 | Bowden et al. | 55/203 |
| 3,439,810 | 4/1969 | Newman et al. | 210/512 |
| 4,147,630 | 4/1979 | Laval, Jr. | 210/137 |
| 4,392,950 | 7/1983 | Beery | 209/211 |
| 4,604,109 | 8/1986 | Koslow | 55/203 |
| 4,729,760 | 3/1988 | Saget | 209/144 |
| 4,966,703 | 10/1990 | Kalnins et al. | 210/512.1 |
| 4,983,283 | 1/1991 | Grey | 210/104 |
| 5,017,198 | 5/1991 | Schieg et al. | 55/203 |
| 5,037,562 | 8/1991 | Tarves, Jr. | 210/781 |
| 5,084,189 | 1/1992 | Richter | 210/512.3 |
| 5,114,568 | 5/1992 | Brinsmead et al. | 210/512.3 |

FOREIGN PATENT DOCUMENTS

| | | | |
|---|---|---|---|
| 887001 | 12/1981 | U.S.S.R. | 209/211 |
| 1526738 | 12/1989 | U.S.S.R. | 55/199 |

*Primary Examiner*—Joseph W. Drodge
*Attorney, Agent, or Firm*—Daniel Rubin

[57] ABSTRACT

Separation method and apparatus in which fluids to be separated into component portions are dynamically separated by a multilayed laminar disc primary impeller that spins at high velocity within a closely fitting cylindrically concentric housing. Separated liquids and/or particulates received from the impeller are allowed to fall into a cavity or conical housing directly beneath the impeller where remixing is prevented while causing the separated fluid component portions to exit separately. The impeller is secured to a tubular shaft acting as a vortex finder. Above the primary impeller is a secondary impeller commonly driven by the same shaft to siphon relatively lighter fluid component portions through the center of the vortex finder and increase output. In the case of solids separation, an underflow trap at the underside exit of the conical housing may be equipped with a flow powered auger that extrudes the settled solids through a spring loaded gate.

24 Claims, 2 Drawing Sheets

HIGH EFFICIENCY CENTRIFUGAL SEPARATION APPARATUS AND METHOD USING IMPELLER

FIELD OF THE INVENTION

The field of art to which the invention pertains comprises method and apparatus for fluid purification.

BACKGROUND OF THE INVENTION

In today's industrial environment many fluids, whether gas or liquid, are subject to mechanical removal of contaminants, particles or impurities before being recycled or reintroduced for ultimate use. These fluids have various sources of origination such as industrial processes or waste that require cleanup before disposal or recycling. The degree of cleanup and ultimate purity of the fluid will of course vary with a standard of purity being maintained for the contemplated end use of the fluid and in many instances is difficult if not very costly to achieve. In some applications, it may even be desirable to recover both of the separated components rather than disposing of one or the other.

BACKGROUND OF THE PRIOR ART

Various devices are known for separating contamination or other impurities from a fluid to be cleansed or purified. Among such devices are the cyclone separator and centrifuge both of which rely on the principle of centrifugal force in achieving separation and fluid purity. The cyclone separator is primarily employed to remove solids and liquids from gases whereas the centrifuge is primarily utilized for liquid separation on a batch basis. Where insufficient removal of fine particles occurs in either of the foregoing it is common to utilize additional apparatus affording finer filtration in a series flow relationship downstream of their discharge. Exemplifying prior art devices of the foregoing type are the disclosures of U.S. Pat. Nos. 3,243,940; 3,439,810; 4,147,630; 4,392,950; 4,966,703; and 4,983,283. Extensive information concerning cyclone operation is contained in *Chemical Engineer's Handbook*, 4th edition by Perry on "Gas-Solids Separation".

While such devices vary in construction somewhat, depending on the particular process or industry with which they are utilized, they characteristically suffer from one or more problems. Typifying the problems are high initial cost due to complexity of the system, high cost of operation resulting from high energy requirements, slow separation rate, short operational windows that adversely affect their output ranges, etc.

OBJECTS OF THE INVENTION

It is an object of the invention to provide novel separation method and apparatus for achieving high purity levels of initially contaminated or impure fluid being processed.

It is a further object of the invention to provide novel separation method and apparatus as in the previous object utilizing a simplified mechanism that operationally facilitates the settling cycle of a wide range of particle sizes and/or closer specific weights of separated elements to achieve high efficiency purification.

It is a still further object of the invention to provide novel method and apparatus as in the foregoing objects that achieve high efficiency purification of continuously flowing fluids with a reduction in energy requirements as compared to similar purpose method and apparatus of the prior art.

SUMMARY OF THE INVENTION

This invention relates to improvements in separation method and apparatus for effecting high efficiency removal of impurities or contaminants from continuously flowing fluids being processed. More specifically, the invention relates to a separation unit that increases the duration of particle impurity settlement while maximizing centrifugal forces imposed on the fluid being processed. The result is to effect increased separation and ultimate fluid purity at a level much greater than previously attained with similar purpose devices of the prior art.

The foregoing is achieved by centrifugal separation having distinct elements which operate in a cooperating manner to effect the results hereof. Included among the latter is a pump providing a continuously metered input of fluid to be processed to the separator. The separator includes a stack of spaced apart discs defining a primary impeller within a closely arranged cylindrical housing at which the input fluid is received. Via a high speed drive, that may optionally be variable, the impeller spins the fluid at a high angular velocity producing an angular momentum. This effectively induces a concentric fluid flow in a narrow weir gap between the disc periphery and the surrounding housing causing suspension settlement in correlation to the spin rate of the impeller. The purified fluid is caused to exit as overflow at the top of the separator unit while impurities, etc are discharged as underflow through an outlet near the bottom of the unit. In the case of liquid to liquid separation, the lighter liquid exits through the overflow and the heavier liquid exits through the bottom outlet. Either or both liquids can be recovered.

In an alternative embodiment, the separator is openly joined at its underside with an elongated conical housing in which cyclonic action results downstream of the impeller. The latter serves to maintain separation between removed impurities and the purified fluid enabling each to exit separately. A vortex stop is optionally included near the outlet of the cyclonic housing that can be adjustably set to vary the purified fluid overflow in a manner unrelated to impeller speed. An output pump is also optionally available to provide a booster output and thereby prevent impeller discharge from overrunning the ability of the cyclone to maintain fluid separation. An auger drive also may optionally be provided to enhance removal of separated solids at the underside of the cone.

Operation is without extraneous turbulence by which remixing could otherwise occur and without stressing of sensitive materials as might be caused by conditioning agents utilized to enhance settling. As a consequence, the processed fluid incurs a significantly high degree of separation from which high purity levels of fluid are afforded.

The above noted features and advantages of the invention as well as other superior aspects thereof will be further appreciated by those skilled in the art upon reading the detailed description which follows in conjunction with the drawings.

DESCRIPTION OF THE PREFERRED EMBODIMENT

Figure 4:
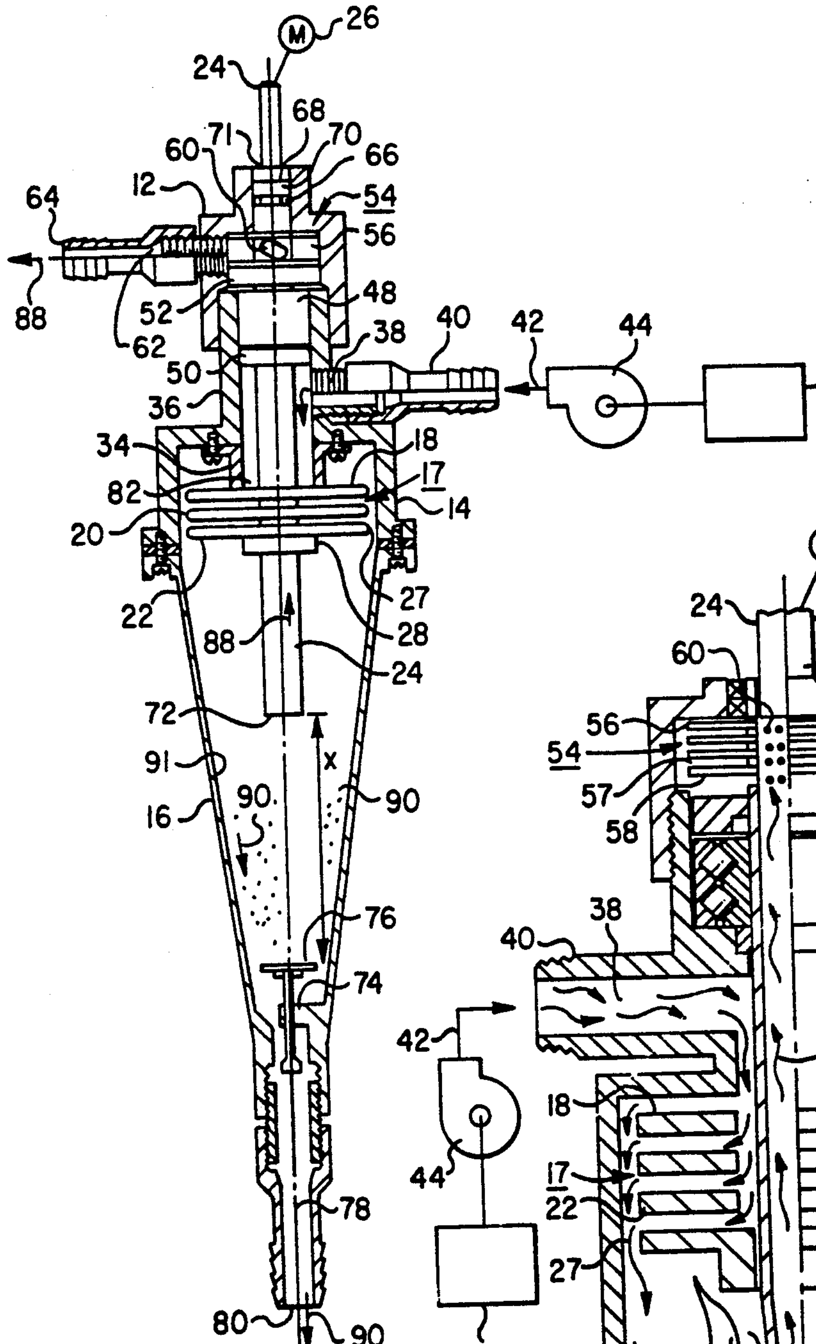
FIG. 4 is a sectional elevation of the separation unit of FIG. 1 in a second embodiment combining the separation unit with a cyclone separator.

In the description which follows, like parts are marked throughout the specification and drawings with the same reference numerals respectively. The drawing figures are not necessarily to scale and the proportions of parts in certain views may have been exaggerated for purposes of clarity.

Figure 1:
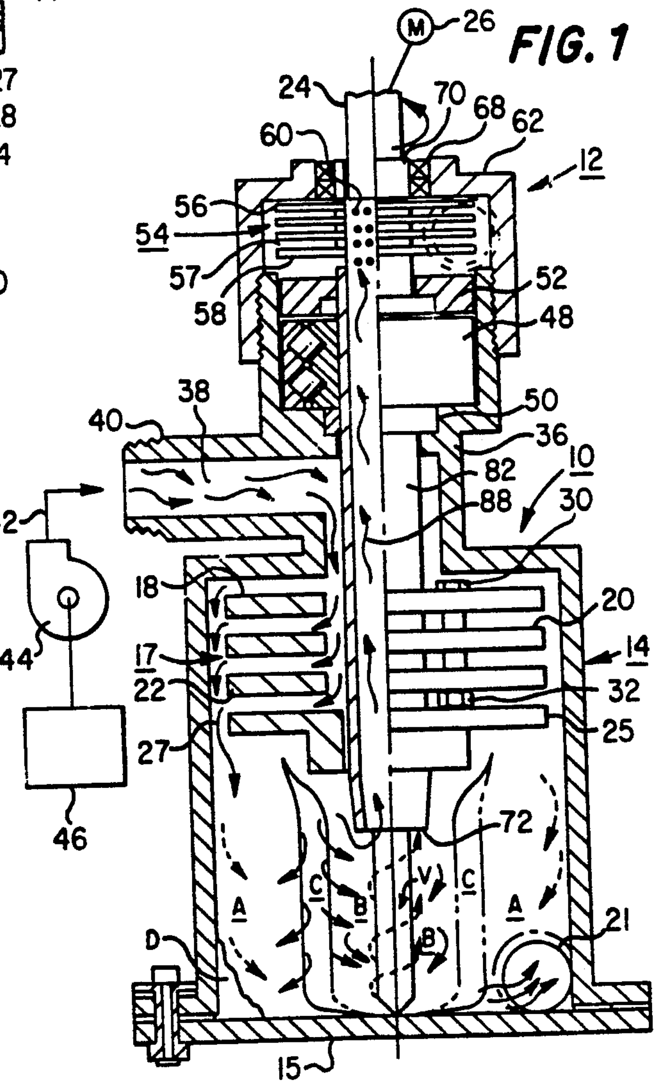
FIG. 1 is a sectional elevation of a first embodiment separation unit in accordance with the invention.
Figure 2:
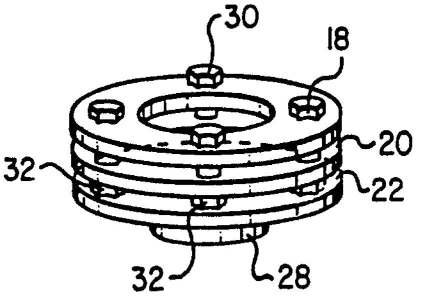
FIG. 2 is a fragmentary enlargement of the impeller drive in the separation unit of FIG. 1.
Figure 3:
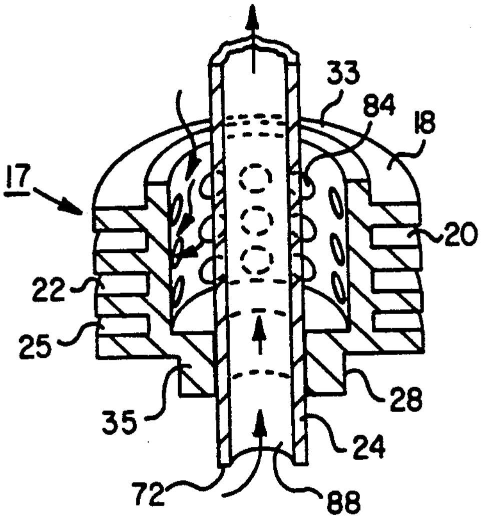
FIG. 3 is a fragmentary enlargement of an alternative impeller drive in the separation unit of FIG. 1.

Referring now to FIGS. 1, 2 and 3, there is illustrated a first embodiment of the apparatus hereof designated 10 comprised of an upper housing 12, and a primary housing 14. A removable cover plate 15 at the underside of housing 14 cooperates with the housing to define an internal cavity 19 leading to an underflow outlet 21. Disposed within the primary housing 14 is a primary impeller 17 comprised of a plurality of spaced apart discs 18, 20, 22 and 25 secured to shaft 24 that is rotationally operated by means of a drive including motor 26 that optionally may include a variable speed transmission (not shown). Between the periphery of each disc and the surrounding housing there is defined a narrow weir gap 27 critically sized in relation to the flow rate and the ability of the impellers to dispose of the flow. A flange 28 on shaft 24 supports the axially lower disc 25 while a plurality of axially penetrating bolts 30 with intervening spacer and end nuts 32 maintain a predetermined spacing therebetween. In FIG. 3, the discs are machined integral with a sleeve 33 that via a set screw (not shown) in hub 35 are centrally secured to shaft 24.

Integrally formed at the top of impeller housing 14 is an upstanding tubular neck 36 to which upper housing 12 is threadedly secured. A side opening 38 in the neck contains a connector 40 through which fluid 42 received from a source 46 may be supplied via a pump 44 for processing. Disposed above neck 36 is a bearing 48 situated above an annular seal 50 while an annular seal 52 is situated within the upper housing 12 immediately above the bearing. Included within the upper housing 12 is a secondary impeller 54 comprised of spaced apart discs 56, 57 and 58 interveningly embracing a plurality of small apertures or slots 60 in shaft 24 at a location on the shaft coincident with the axis of side outlet 62. Within an upstanding upper neck 66 at the upper housing 12 is a bearing 68 and an annular seal 70. It can there be seen that rotational shaft 24 converts at 71 (FIG. 4) from a solid drive shaft at the motor connection above bearing 68 to a tubular shaft descending therefrom to its distal end 72.

As will be understood, rotation of impeller 54 by shaft 24 induces a suction force through slots 60 extending into tubular shaft 24. The effect of the applied suction is to induce flow of purified fluid via a vortex "V" at the inlet shaft end 72 for discharge through outlet 62. At the same time, sediment or heavy liquids A, light liquids B and/or solids D disperse within cavity 19 to discharge through underflow outlet 21.

In operation, with motor 26 and its associated drive operative, rotation of shaft 24 causes both impellers 17 and 54 to spin at a high rotational speed in the range of about 800 to 20,000 RPM so as to produce G forces on the order of between 230–6300 G's and above. The spinning of primary impeller 17 initiates suction flow through the inlet connector 40 of fluid 42 supplied by pump 44. As fluid 42 enters the supply channel 82 leading to impeller 17 it is caused to flow downward until engagement with the impeller is incurred. On reaching the impeller, some fluid will flow onto disc 18 while the remainder will self-distribute through apertures 84 onto the remaining discs. With the discs rotating, the fluid thereon radially distributes about the disc surface and is subject to the centrifugal forces imposed by the discs. This causes the fluid and its impurities to separate as it is expelled into weir gap 27 against the concentric walls of the impeller housing 14 thereabout.

As the separation occurs, the lighter fluids 88 are siphoned off by the vortex finder 72 at the distal end of shaft 24. Within shaft 24, the lighter fluids are caused to flow upward through the open slots or apertures 60 within the secondary impeller 54 to be expelled through the side outlet 62. Concomitantly, the relatively heavy, now separated particles, contaminants, or other impurities A, B or C liquid or solid enter cavity 19 from which they discharge via outlet 21 to a suitable disposal site. Where liquid to liquid separation is performed, either or both liquids at the outlets 21 and 62 can be disposed of or recovered. During the course of flow, flexible seals 50 and 52 maintain separation of the flows and protect the bearing 48 thereat. Above the secondary impeller, the seal 70 protects the input shaft 24 and bearing 68.

In the foregoing manner, the centrifugal forces occurring about the disc faces and at the weir gap 27 just beyond the spinning discs of primary impeller 17 improve the degree and amount of separation occurring through the modification of the flow paths and the increased length of time exposed to the high "G" forces. The highest "G" forces in this structure appear to occur at the weir gap 27 where the compression of the laminar flows produce rapid deceleration of the external flow path as it encounters the impeller housing. The incurred forces overcome obstructed flow/pressure buildup while the delayed flow allows angular momentum to be imparted so as to accelerate the settling rate of the heavier suspensions. The frictional resistance of fluids impacting against the interior walls of housing 14 enhance settling through rapid deceleration that in turn increases incidental contact of solid or heavier liquids which aid adhesive or cohesive forces.

Any number of discs may be selected for the primary impeller as a function of the thruput rate. The spacing between discs, the diameter of the discs, rotational velocity, etc. are subject to variation in operational parameters for which the apparatus hereof is to be utilized. That is, depending on whether the fluid comprises a liquid or gas, the viscosity of the fluid, the thruput rate of fluid to be maintained, the degree of separation to be achieved, etc. are all factors affecting the selected number of discs, spacing between discs and rotational disc velocity. Advance knowledge of the fluid properties to be processed for separation is of course helpful to ensure that adequate clearances are maintained to avoid caking between the impeller discs or on the adjacent housing wall. For whatever fluid being processed, the mentioned factors are selected such as to specifically generate "G" forces at the disc periphery on the order mentioned supra.

Use of the weir gap 27 also serves to indirectly control the amount of turbulence created between overlapping zones. In this relationship the weir discourages flow breakups that could otherwise allow adjoining flows to impact each other as part of a wall friction generated eddy current. Also discouraging eddies are the function of the rotational flow being relieved along the intersection of the overlapping flow fields as they are simultaneously ejected from the impeller into the underlying cavity 19.

It will be appreciated that unlike other centrifugal separators of the prior art, the impeller discs in the device hereof are not load supporting in regard to the centrifuged liquids. Consequently, they are not subject to the imbalancing created by a disproportionate accumulation of solids at the circumference and because of which higher spin speeds can be attained to impart greater centrifugal forces against the fluid than otherwise. It would appear in the device hereof that a combination of forces occurs along the face and just beyond the edge of the spinning discs so as to improve the degree and amount of separation through the modification of the flow paths and the length of time the fluid is subjected to high "G" forces. The highest "G" forces occur where the compression of the laminar flows produce the rapid deceleration of the external flow path as it encounters the surrounding housing wall thereat. Being that the flow is laminar along the disc face, delaminant stressing-capillary precipitation sets the stage for additional centrifugal separation beyond the edge of the discs. The differing rate of acceleration between the various weighted materials in the flow cause them to arrive at different locations along the flow path within a given span of time. As a consequence, the capillary and ventural forces of the lighter high velocity liquids chase the low pressure boundary effect to the edge of the discs causing the lighter fluids to follow an ever tightening arcing path that accentuates the centrifugal separation process.

For the embodiment of FIG. 4, lower cover plate 15 is omitted from housing 14, underflow outlet 21 is closed or eliminated and a lower conical housing 16 is openly secured thereto. Located at the lower end of the conical housing 16 is a lateral ledge 74 threadedly supporting a vertically adjustable T-shaped vortex stop 76 in the passage 78 leading to an outlet 80. As will be explained, stop 76 functions to preset the flow rate of the device in conjunction with the rotational speed of the impellers to in turn control the degree of separation of the fluid being processed. While purified fluid 88 is induced to flow in shaft 24 to outlet 62, the heavier fluids or particulates 90 are caused to settle and fall past the adjustable vortex stop 76 into passage 78. From there they gravitionally exit through outlet 80 for delivery to a suitable disposal site.

The laminar flow pattern of cyclonic event along the disc surfaces allow settlings to remain toward the internal periphery of housing 16. The pull of gravity is thereby more easily overcome allowing settling to occur through housing 16 for a slide down effect on walls 91 toward the vortex stop 76. The latter is threadedly positionable in ledge 74 and by virtue of the vertical spacing or window "X" between the head of stop 76 and the face of inlet 72 it establishes the desired degree of flow cutoff through slots 60 and outlet 62.

Figure 5:
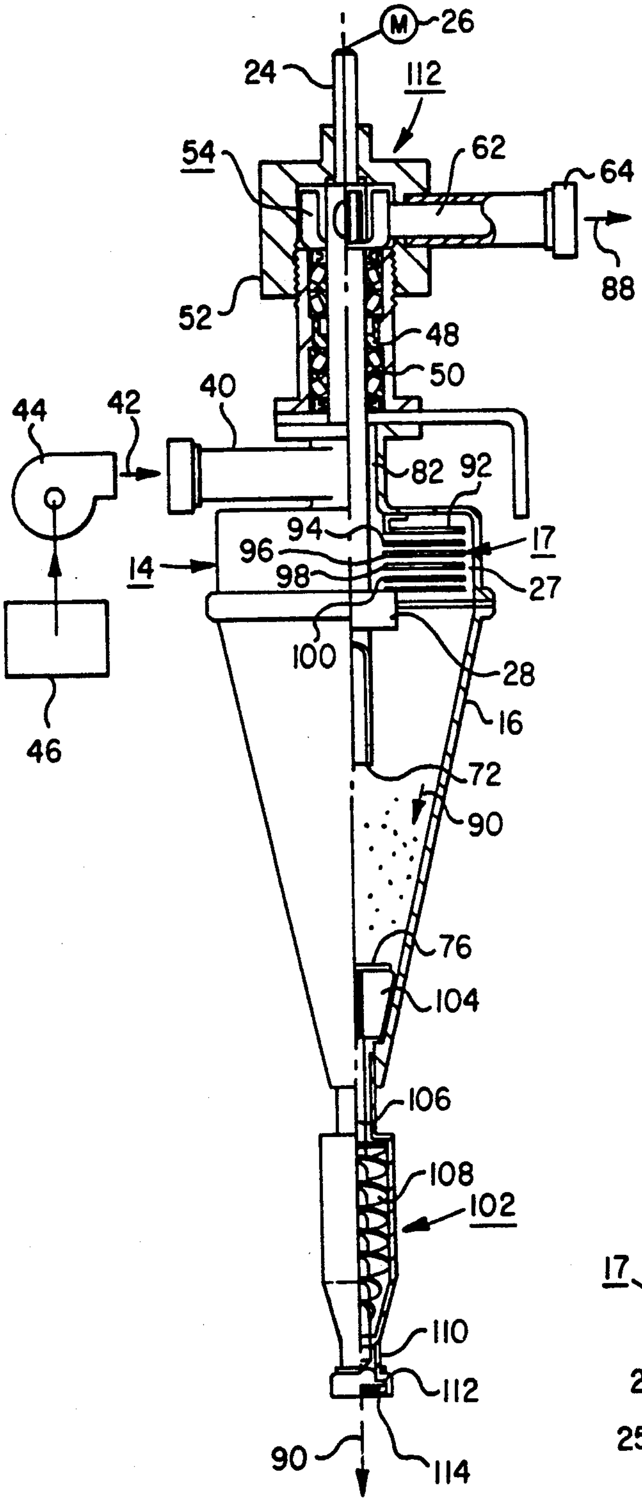
FIG. 5 is a partially sectioned elevation of a third embodiment separation unit similar to the combination unit of FIG. 4.

Referring now to FIG. 5, there is disclosed a second cyclonic embodiment having capacity on the order of about 200 gallons per minute as compared to about 7 gallons per minute for the embodiment of FIG. 4. For these purposes, primary impeller 17 includes a total of five annular discs here designated 92, 94, 96, 98 and 100 otherwise assembled or manufactured as before. Also included in this embodiment is a positive drive solids removal mechanism 102 that includes a plurality of spaced apart vanes 104 powered by fluid flow circulation thereabout. Twisting of the vanes beneath the vortex stop 76 propels a shaft 106 axially extending through the center of a compressing auger 108. By means of the rotating shaft, energy is transmitted through an orbital gear array 110 causing auger 108 to rotate. The auger rotation internally compresses the settling solids 90 against a slotted disc 112 that gives way to the increasing pressure and extrudes the particulate as a mud slug through the underflow outlet exit 114.

To exemplify use of the embodiment of FIG. 4, a visual test setup was established using flow meters at the intake 40 and the two outlets 64 and 80. Petcocks were installed to facilitate direct sampling of the output flows, while at the outlet 64 a gradient filter block was installed to assist in ascertaining the extent of separation occurring during a sampling sequence. These tests were conducted for trace evidence of suspensions larger than 10 microns and then 0.45 microns respectively. For each test, fluid to be purified was taken from a five gallon reservoir following a vigorous stirring. After two days of rest, clear fluids were disposed of and the remains were allowed to air dry. The remaining solids were then used as a voluminous comparison representative of the total available solids in the test solution. Both tests were conducted with the primary impeller 17 operating at 800–1200 RPM generating G forces of up to and exceeding 2300 G's. The underflow valve at exit 80 was cracked to allow a slight but unmeasurable flow of less than 0.10 GPM in order to enhance fine settling separation.

In one test, untreated well water was obtained from a site in Oklahoma. The well water contained fine red clay silt, approximately 15% by volume and was introduced at an inlet flow rate of slightly in excess of 2 gpm. Visual observance of separation provided a distinct indication of clarification realized by comparison of the inlet flow to the overflow by a factor of approximately 3:1. With a 10 micron suspension and above some discoloration of the downstream filter medium was noted with only traces of sedimentation. At 0.45 micron suspension and above some silt was identified indicating that a significant percentage of silt was smaller than 0.45 microns.

Another test was conducted with the same test setup and with water obtained from the sump of a cooling tower containing black rubber particles from 10 to 200 microns, carbon black and organic growth along with some mold and algae representing about 5–8% by volume. At a flow rate of slightly in excess of 2 gpm, the overflow was clear and free of contamination. At 10 microns there was some filter discoloration and a slight accumulation of residue. At 0.45 microns and above some slime and carbon black residue was noted but the water otherwise lacked any visible evidence of contamination.

Performance results will typically vary within the ninety percent efficiency range, but to a large extent can be controlled by changing physical and operating parameters of the equipment. For liquid-solids separation, projected efficiencies are in excess of ninety percent with greater efficiency to on the order of ninety seven percent achieved with particles above 20 microns. For liquid-liquid separation, efficiencies of greater than ninety-ninety-nine percent can be anticipated.

By the above description there is disclosed novel method and apparatus affording a high removal level of contaminant particles or other impurities from a fluid being processed so as to render the fluid readily reusable for recycling or reintroduction. Being that the flow is continuous rather than in batch, vast amounts of fluid can be efficiently purified so as to avoid the necessity of providing alternative sources of supply. At the same time, the relative simplicity of the system avoids high initial cost, while operating with relatively lower energy requirements and effecting more rapid separation of the fluid contaminants. The virtues thereof are many and can be readily adapted for use with a variety of different fluids whether gas or liquid for fulfilling a long felt need in the industry.

Since many changes could be made in the above construction, and many apparently widely different embodiments of this invention could be made without departing from the scope thereof, it is intended that all matter contained in the drawings and specification shall be interpreted as illustrative and not in a limiting sense.

I claim:

1. Apparatus for separating fluids into components comprising:

a centrifugal separator having a primary impeller of stacked apart discs formed of a substantially imperforate composition;

a housing internally surrounding said separator so as to define a predetermined narrow gap spacing intervening between the peripheries of said discs and the housing surface thereat;

a cavity within said housing underlying said impeller and in flow communication with said gap;

a tubular impeller shaft centrally supporting said impeller for rotation and extending imperforate from an entrance opening within said cavity through which to receive a separated component of a fluid flow to a relatively isolated release opening above said impeller through which the separated flow component received at said entrance is released;

motor means operable when actuated to effect rotation of said primary impeller at relatively high rotational speeds sufficient to effect a force level at the rotating peripheries of said discs of at least about 230 g's;

an inlet defined in flow communication with said housing through which fluid to be separated is to be introduced to said rotationally operable primary impeller to be impelled by said rotating discs toward and into said gap for initiating separation within said gap of the component portions comprising the received fluid;

a first exit in flow communication with said shaft release opening through which said separated fluid component is to be discharged; and a second exit in flow communication with said cavity through which another separated fluid component is to be discharged.

2. Apparatus in accordance with claim 1 in which a controlled spacing defining a weir is maintained between the peripheries of said impeller discs and the surrounding surface of said housing.

3. Apparatus in accordance with claim 2 including a vortex finder associated with the entrance opening of said shaft into which the relatively lighter of the separated fluid components is induced to enter.

4. Apparatus in accordance with claim 3 in which said shaft includes at least one release opening in said shaft in flow communication with said first exit for the relatively lighter weight of the separated fluid component entering said vortex finder to discharge through said first exit.

5. Apparatus in accordance with claim 4 including a secondary impeller displaced from said primary impeller and secured to said shaft about said shaft release opening for expelling fluid flow thereat toward and outward of said first exit.

6. Apparatus for purifying fluids containing impurities to be removed comprising;

a centrifugal separator having a primary impeller of stacked spaced apart discs formed of a substantially imperforate composition;

a first housing internally surrounding said separator so as to define a predetermined gap spacing intervening between the peripheries of said discs and the housing surface thereat;

a second housing of generally conical configuration secured to the underside of said first housing and in communication with said gap;

at least one tubular shaft centrally supporting said impeller for rotation and extending imperforate from an entrance opening located within said second housing through which to receive purified fluid flow to a relatively isolated release opening above said impeller through which the purified fluid flow received at said entrance is released;

motor means operable when actuated to effect rotation of said primary impeller at relatively high rotational speeds sufficient to effect a force level at the rotating peripheries of said discs of at least about 230 g's;

an inlet defined in communication with said first housing through which fluid to be purified is to be introduced to said rotationally operable primary impeller to be impelled by said rotating discs toward said gap for initiating separation of the impurities from the received fluid;

a first exit in communication with said shaft release opening through which said purified fluids is to be discharged; and a second exit at an underside location on said second housing through which said removed impurities are to be discharged.

7. Apparatus in accordance with claim 6 in which a controlled spacing defining a weir is maintained between the peripheries of said impeller discs and the surrounding surface of said first housing.

8. Apparatus in accordance with claim 6 including a vortex finder associated with the entrance opening of said shaft into which said purified flow is induced to enter.

9. Apparatus in accordance with claim 8 in which said shaft includes said at least one release opening in said shaft in communication with said first exit for fluid flow entering said vortex finder to discharge through said first exit.

10. Apparatus in accordance with claim 9 including a secondary impeller displaced from said primary impeller and secured to said shaft about said shaft release opening for expelling fluid flow thereat toward and outward of said first exit.

11. Apparatus in accordance with claim 10 including adjustment means presettable for varying the flow rate of the purified fluid flow through said vortex finder toward said first exit.

12. Apparatus in accordance with claim 11 in which said adjustment means comprises a vortex stop in the flow path toward said second exit and said adjustment means is positionable toward and away from said vortex finder for varying the flow rate of the purified fluid entering said vortex finder.

13. Apparatus in accordance with claim 9 in which said motor means is operably connected to said impeller shaft and comprises a variable speed drive.

14. Apparatus in accordance with claim 9 in which the stacked discs of said primary impeller comprise a plurality of discs and there is provided apertures in said discs in the vicinity of said shaft for distributing the fluid received through said inlet onto the rotating surfaces of said discs.

15. Apparatus in accordance with claim 6 including removal means located within said second housing at said second exit to effect a forced discharge of separated impurities outward through said second exit.

16. Apparatus in accordance with claim 15 in which said removal means includes a rotatable auger operable to extrude the impurities outward through said second exit.

17. Apparatus in accordance with claim 16 in which said removal means includes vanes in a fluid flow circulation path within said second housing and said vanes are operable in response to flow circulation therein to effect rotation of said auger.

18. A method of separating fluids into component portions comprising the steps of:

providing a rotationally operable centrifugal separator within a surrounding housing so as to define a predetermined narrow gap spacing therebetween, said separator comprising a plurality of stacked spaced apart discs formed of substantially imperforate composition;

providing a drive to effect rotation of said separator at a rotational velocity sufficient to impose a predetermined force level of at least 230 g's at the periphery of said separator;

providing an entrance in said housing through which fluid to be separated can be continuously introduced to said separator to be impelled by said separator toward and into said gap for initiating separation within said gap of said impelled fluid;

providing a cavity within said housing underlying said centrifugal separator in flow communication with said gap and into which separated flow from said separator is received;

providing a first exit in flow communication with said cavity through which at least one separated fluid portion can be discharged;

providing a second exit in flow communication with said cavity through which other separated fluid portions can be discharged; and continuously introducing controlled quantities of fluid to be separated into said entrance.

19. A method in accordance with claim 18 in which the introduced fluid is to be separated into portions comprising liquid and solids.

20. A method in accordance with claim 18 in which the introduced fluid is to be separated into portions comprising liquid and liquid.

21. A method in accordance with claim 18 in which the introduced fluid is to be separated into portions comprising gas and solids.

22. A method of fluid purification comprising the steps of:

providing a rotationally operable centrifugal separator within a surrounding housing so as to define a predetermined gap spacing therebetween, said separator comprising a plurality of stacked spaced apart discs formed of substantially imperforate composition;

providing a drive to effect rotation of said separator at a rotational velocity sufficient to impose a predetermined force level of at least 230 g's at the periphery of said separator;

providing an entrance in said housing through which fluid containing impurities to be removed can be continuously introduced to said separator to be impelled by said separator toward said gap for effecting centrifugal separation of the impurities from said fluid;

providing a cyclonic housing in an underlying flow relation to said gap and into which the impelled fluid flow is received;

providing a first exit in communication with said cyclonic housing through which purified fluid from said introduced fluid can be discharged;

providing a second exit in communication with said cyclonic housing through which impurities removed from said introduced fluid can be discharged; and continuously introducing controlled quantities of fluid to be purified into said entrance.

23. A method in accordance with claim 22 in which there is included an additional step of providing a vortex finder in flow communication with said first exit for receiving the purified fluid downstream of said separator to be discharged through said first exit.

24. A method in accordance with claim 23 in which said gap is of controlled dimension defining a weir between the peripheries of said discs and the surface of the surrounding housing and through which the introduced flow is entirely expelled toward said cyclonic housing.

* * * * *